Sept. 5, 1967 T. E. PIAZZE 3,339,340
APPARATUS FOR HEAT SEALING PLASTIC PACKAGES
Filed Nov. 21, 1963 2 Sheets-Sheet 1
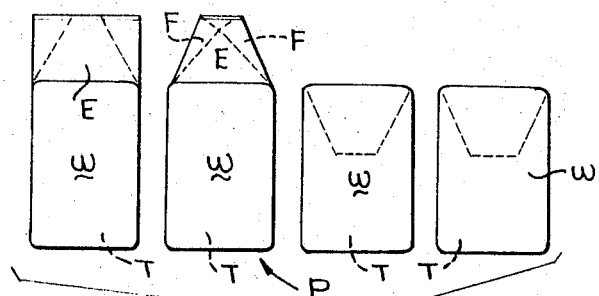
FIG.1
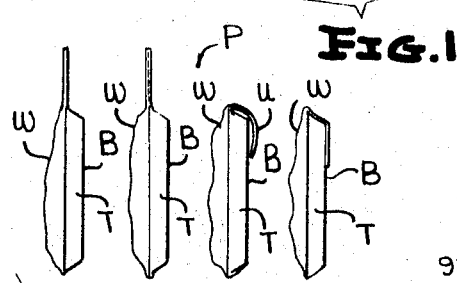
FIG.2
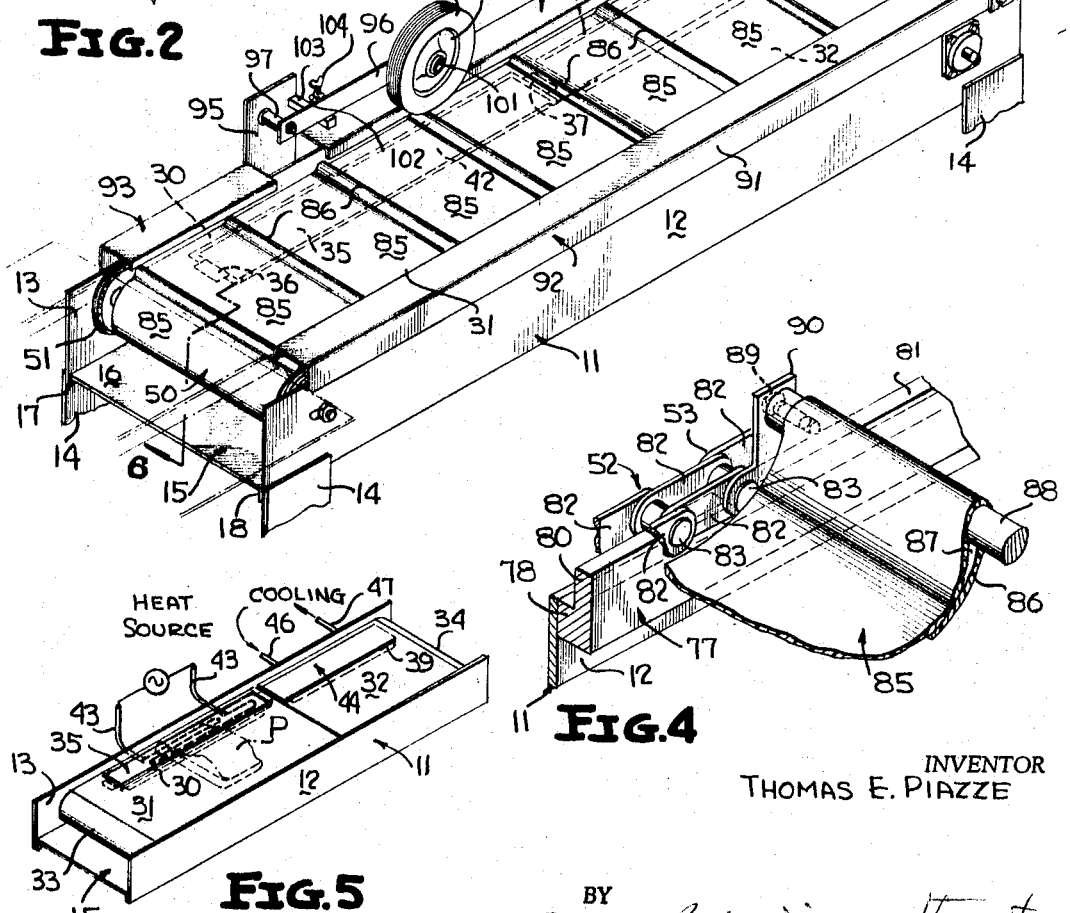
INVENTOR
THOMAS E. PIAZZE
BY
Mason, Porter, Diller & Stewart
ATTORNEYS Sept. 5, 1967  T. E. PIAZZE  3,339,340
APPARATUS FOR HEAT SEALING PLASTIC PACKAGES
Filed Nov. 21, 1963  2 Sheets-Sheet 2
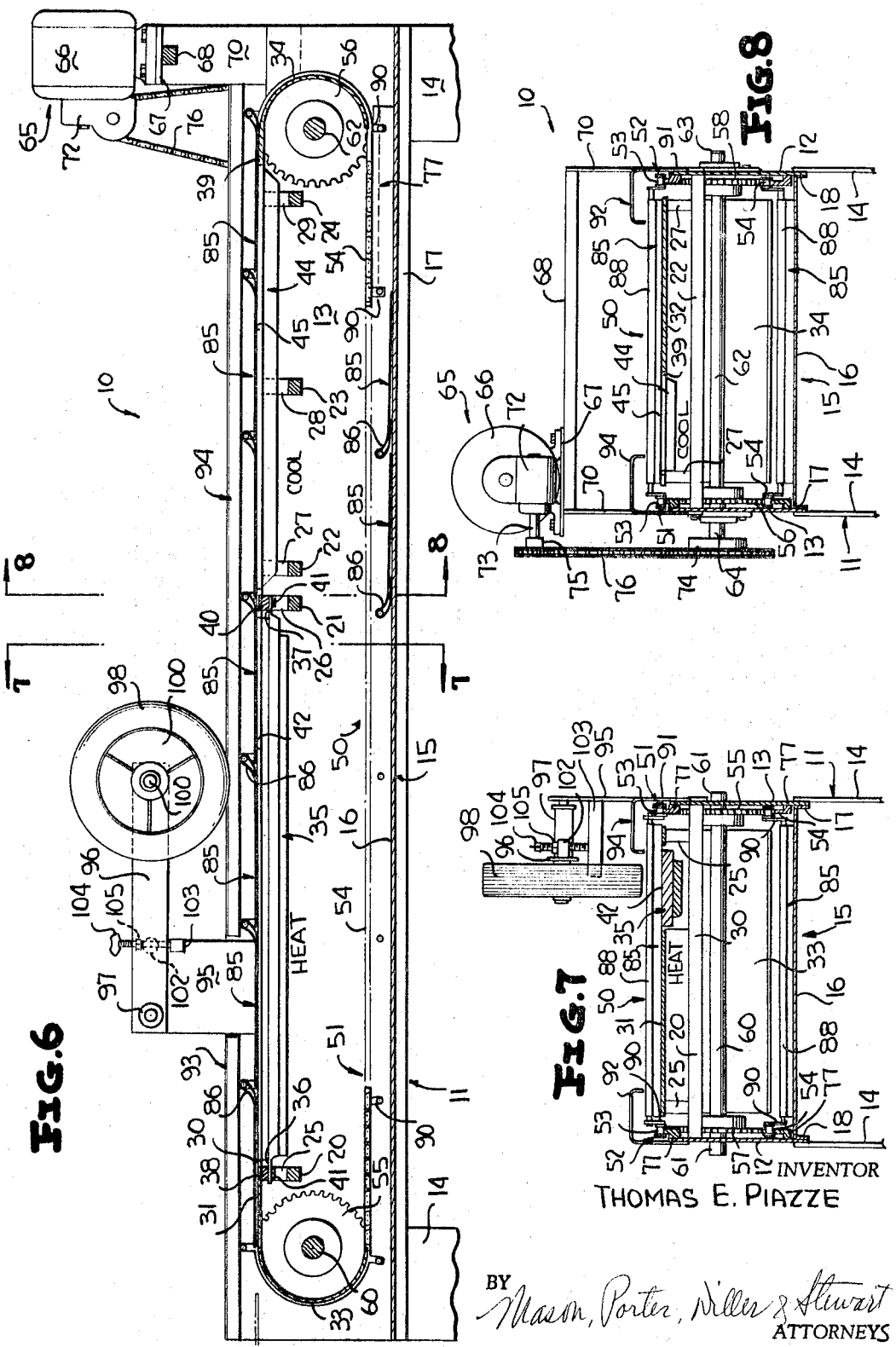
INVENTOR
THOMAS E. PIAZZE
BY Mason, Porter, Diller & Stewart
ATTORNEYS

United States Patent Office 3,339,340
Patented Sept. 5, 1967

3,339,340
APPARATUS FOR HEAT SEALING
PLASTIC PACKAGES
Thomas E. Piazze, Mount Vernon, Ohio, assignor to Continental Can Company, Inc., New York, N.Y., a corporation of New York
Filed Nov. 21, 1963, Ser. No. 325,290
12 Claims. (Cl. 53—388)

This invention relates to a novel method of and an apparatus for heat sealing packages of the type including one or more articles wrapped in a thermoplastic film by successively conveying each of a plurality of such packages on a thermal-conductive member over heated and cooled surfaces to sequentially fuse and cool free edge portions of the thermoplastic film to form effective heat sealed packages.

It is customary to heat seal one or a plurality of articles in a thermoplastic film or wrapper by contacting folded edge portions of the wrapper directly against a hot surface of a heating plate. Such packages are generally pushed or otherwise transported over the hot surface of the plate by a conventional mechanism. As the thermoplastic material softens it tends to stick to the surface of the plate, and such sticking between the package and the plate generally results in a defectively sealed package. Furthermore, under such conditions the thermoplastic material of the wrapper is deposited upon, adheres to and contaminates the surface of the heating plate in a very short period of time. Such contamination prevents further efficient heat sealing of the packages and, of course, increases down-time when such contaminating plates must necessarily be cleaned or replaced before further operations can proceed.

Conventional apparatuses for eliminating some of the foregoing disadvantages have been developed, but such apparatuses generally include other inherent disadvantages which preclude the formation of effectively heat sealed packages. For example, such aforementioned packages are conventionally transported upon an upper run or web of an endless belt conveyor. As the conveyor or belt is driven in a conventional manner, the upper web sequentially passes through a heating area where the thermoplastic material of the package is fused and then passes through an area where the fused seal is cooled before the heat sealed package is discharged from the conveyor. These heating and cooling areas are relatively narrow in the direction of package travel and cause a generally uneven expansion and contraction of the upper web of the belt conveyor and, consequently, the formation of an unsatisfactorily sealed package. This constant normal temperature gradient also weakens the structural integrity of the belt conveyor which, in a relatively short period of time, becomes extensively damaged and must be replaced. Such replacement is relatively expensive because the entire damaged belt must be replaced, the belt is relatively expensive and considerable machine down-time is required for any such replacement.

When such a conveyor belt is entrained about friction pulleys and the packages positioned upon the upper web or run are relatively heavy, slippage between the conveyor belt and the pulleys prevents the maintenance of a relatively uniform rate of speed. It is also very difficult to keep such a belt tracking properly under the alternating heating and cooling conditions imposed on the belt.

It is, therefore, an object of this invention to eliminate each of the above and other disadvantages inherent in conventional heat sealing mechanisms and methods by providing a novel heat sealing apparatus which includes a plurality of relatively inexpensive and readily replaceable thermal-conductive members forming portions of a conveyor mechanism upon which articles wrapped in a thermoplastic film are successively conveyed over heating and cooling plates to rapidly form efficient, fluid-tight, heat sealed packages.

A further object of this invention is to provide a novel apparatus for sealing thermoplastic packages comprising a conveyor having upper and lower spaced pairs of conveyor runs, heating means supported between the upper pair of conveyor runs, a plurality of individual thermal-conductive means between the conveyor runs for carrying the thermoplastic packages across and beyond the heating means, the individual means each being a sheet-like member, and means movably connecting each of the sheet-like members at only one side thereof between the conveyor runs.

A further object of this invention is to provide a novel apparatus of the type immediately above-described wherein each of the sheet-like members is constructed from thin woven fiberglass cloth impregnated with a polymerized tetrafluoro ethylene composition whereby contamination of the heating means during a heat sealing operation by the apparatus is precluded.

A further object of this invention is to provide a novel apparatus which includes each of the elements above set forth, and in addition, to provide means for urging the thermoplastic packages carried by each of the sheet-like members into intimate contact therewith to produce an efficient seal when such packages are of a relatively lightweight nature.

Still another object of this invention is to provide a novel apparatus for heat sealing articles wrapped in a thermoplastic film comprising a conveyor having upper and lower spaced pairs of conveyor runs, heating means supported between the upper pair of conveyor runs, cooling means supported between the upper pair of conveyor runs downstream of the heating means, a plurality of individual means between the pairs of conveyor runs for carrying the wrapped articles over and across the heating and cooling means, the individual means each being a themal-conductive sheet-like member, means swingably connecting each of the sheet-like members at only one side thereof between the conveyor runs, and the heating means including a supporting surface which is substantially coplanar to a plane through the upper pair of conveyor runs whereby each of the sheet-like members is supported by the supporting surface of the heating means and each of the sheet-like members in turn supports a thermoplastic package carried thereby over and beyond both the heating means and the cooling means.

A further object of this invention is the provision of a novel method of forming heat sealed thermoplastic packages comprising the steps of providing a heat-emitting planar surface, conveying a plurality of thermoplastic packages with free edge portions thereof facing the heat-emitting surface on thermal-conductive sheet-like members, indirectly supporting each of the packages solely by the heat-emitting surface, and simultaneously with this last step, indirectly heating the free edge portions by the heat emitted from the surface to heat seal the free edge portions of the plurality of thermoplastic packages.

With the above and other objects in view that will hereinafter appear, the nature of the invention will be more clearly understood by reference to the following detailed description, the appended claims and the several views illustrated in the accompanying drawings.

In the drawings:

FIGURE 1 is a schematic top plan view of a package of which the novel apparatus of this invention is particularly adapted to heat seal, and illustrates four positions of an edge portion of a thermoplastic wrapper of the package.

FIGURE 2 is a schematic side elevational view of the package of FIGURE 1, and more clearly illustrates the four positions of the edge portion of the thermoplastic wrapper.

FIGURE 3 is a fragmentary top perspective view of a novel heat sealing apparatus of this invention, and illustrates a plurality of sheet-like members forming a portion of a conveyor mechanism and a heating and cooling plate underlying an upper run of the conveyor mechanism.

FIGURE 4 is an enlarged fragmentary view of one of the sheet-like members, and illustrates the sheet-like member swingably carried by a transverse support of the conveyor mechanism.

FIGURE 5 is a schematic top perspective view of a portion of the conveyor mechanism of FIGURE 3, and more clearly illustrates the heating and cooling plates located to one side of a longitudinal center line through the conveyor mechanism.

FIGURE 6 is an enlarged fragmentary longitudinal sectional view taken along line 6—6 of FIGURE 3, and illustrates the plurality of sheet-like members of the upper run being supported by the heating and cooling plates, and a lower plate maintaining sheet-like members carried by a lower run of the conveyor mechanism in a generally horizontal plane.

FIGURE 7 is a transverse sectional view taken along line 7—7 of FIGURE 6, and illustrates a freely rotatable tire supported in longitudinal alignment with and above the heating plate.

FIGURE 8 is a transverse sectional view taken along line 8—8 of FIGURE 6, and illustrates a drive mechanism of the heat sealing apparatus of this invention.

An apparatus constructed in accordance with this invention for heat sealing packages formed by wrapping one or more articles in a thermoplastic film or wrapper is best illustrated in FIGURES 3 and 6 through 8 of the drawings, and is generally designated by the reference numeral 10. The heat sealing apparatus 10 comprises a base or support 11 which includes a pair of elongated side rails or plates 12 and 13. An identical plate or bracket 14 is welded or otherwise conventionally secured to opposite end portions of each of the side plates 12 and 13. The brackets or plates 14 are adapted to support the base 11 of the apparatus 10 in a conventional manner adjacent a packaging machine (not shown). A shallow inverted substantially U-shaped lower plate 15 (FIGURES 7 and 8) having a bight portion 16 and a pair of opposed depending flanges or legs 17 and 18 is secured between the side rails 12 and 13 of the base 11. The plate 15 is preferably secured between the side rails 12 and 13 by welding the depending flanges 17 and 18 to the respective side rails 13 and 12, as is best illustrated in FIGURE 8 of the drawings. The bight portion 16 of the inverted U-shaped plate 15 performs a function to be described more fully hereafter.

A plurality of longitudinally spaced transverse braces 20 through 24 (FIGURE 6) are welded between the inner surfaces (unnumbered) of the side rails 12 and 13. The transverse braces 20 through 24 cooperate with the lower plate 15 to reinforce the support 11 and maintain the side rails 12 and 13 thereof in spaced parallel relationship, as is best illustrated by the transvesre braces 20 and 22 of FIGURES 7 and 8 respectively of the drawings. An identical short vertical support 25 through 29 is welded to the opposite end portions (unnumbered) of the respective transverse braces 20 through 24, in a manner clearly illustrated by the short supports 25, 25 and 27, 27 of FIGURES 7 and 8 respectively. A substantially rectangular plate 31 is secured at the corners thereof to the short supports 25, 25, 26, 26 as for example by welding. A substantially identical rectangular plate 32 is similarly secured at the corners thereof to the short supports 27, 27, 29 and 29. The short supports 28, 28 carried by the transverse brace 23 are also secured substantially medially of the rectangular plate 32. In this manner, the transverse braces 20 through 24 and the respective short supports 25 through 29 carried thereby support the rectangular plates 31 and 32 in coplanar relationship above and parallel to a plane of the bight portion 16 of the inverted shallow U-shaped plate 15, as is best illustrated in FIGURES 6 through 8 of the drawings.

The rectangular plate 31 is provided with a substantially rectangular slot or opening 30 located to one side of a longitudinal center line through the heat sealing apparatus 10. The rectangular plate 32 is similarly provided with a substantially rectangular slot or opening 39 located to one side of a longitudinal center line through the heat sealing apparatus 10. An arcuate plate 33 (FIGURES 5 and 6) is welded to the plate 31 while a similar arcuate plate 34 is welded to the plate 32 in opposed relationship to the arcuate plate 33. The arcuate plates 33 and 34 are each curved about an angle of approximately 180°, as is best shown in FIGURE 6 of the drawings.

A heating plate or hot plate 35 (FIGURES 5 through 7) is positioned in the rectangular opening 30 of the plate 31. The heating plate 35 includes two identical oppositely directed flanges 36 and 37 (FIGURE 6) which underlie depending securing blocks 38 and 40 respectively. The blocks 38 and 40 are welded to the lower surface (unnumbered) of the plate 31 and an identical bolt 41 (FIGURE 6) passed through an opening (unnumbered) in each of the flanges 36 and 37 and is threadably secured to the respective securing blocks 38, 40 to secure the heating plate 35 in the opening 30 of the plate 31. An upper planar surface 42 of the heating plate 35 is flush with the upper surface (unnumbered) of the plate 31.

The heating plate 35 is conventional, and can be, for example, a resistance heater which is energized from a suitable heat source (FIGURE 5), such as a conventional source of alternating current, by a pair of identical conductors 43.

A cooling plate or cold plate 44 is positioned in the opening 39 of the plate 32. The cooling plate 44 is secured in the opening 39 in a conventional manner, as for example, by welding the cooling plate 44 to the plate 32 or providing the cooling plate 44 with flanges similar to the flanges 36 and 37 of the heating plate 35 and employing conventional fastening means to secure the cooling plate 44 to the plate 32. Irrespective of the manner by which the cooling plate 44 is secured in the opening 39 of the plate 32, an upper planar surface 45 of the cooling plate 44 is in coplanar relationship with the upper surface 42 of the heating plate 35 and the upper surfaces (unnumbered) of the plates 31 and 32, as is best illustrated in FIGURE 6 of the drawings.

The cooling plate 44 is preferably of a conventional hollow or chamber-like construction (not shown) into which a suitable cooling medium is introduced through a conduit 46 (FIGURE 5) and discharged through a conduit 47.

A conveyor or conveyor mechanism 50 including first and second conveyor chains 51 and 52 respectively runs the length of the support 11 and is housed between the side rails 12 and 13 thereof. The conveyor chains 51 and 52 are transversely spaced from each other to define an upper pair of chain conveyor runs 53, 53 and a lower pair of chain conveyor runs 54, 54. The chain 51 is entrained about a driven sprocket 55 and a drive sprocket 56 while the conveyor chain 52 is similarly entrained about a driven sprocket 57 and a drive sprocket 58. The driven sprockets 55 and 57 are carried by a shaft 60 having identical end portions 61, 61 journalled in a conventional manner in the side rails 12 and 13 at an entrance end portion (unnumbered) of the heat sealing apparatus 10. The drive sprockets 56 and 58 are similarly carried by a shaft 62 having end portions 63 and 64 journalled in a conventional manner in the respective side rails 12 and 13 of the support 11 adjacent a discharged end (unnumbered) of the heat sealing apparatus 10.

The sprockets 56 and 58 are driven in a clockwise direction as viewed in FIGURE 6 of the drawings to move the upper pair of chain conveyor runs 53, 53 left-to-right and the lower pair of chain conveyor runs 54, 54 right-to-left as viewed in this figure by a drive mechanism 65.

The drive mechanism 65 comprises an electric motor 66 conventionally secured to a plate 67 which is in turn welded to a transverse brace 68. The transverse brace 68 is in turn welded at each end thereof to an identical upstanding plate 70. Each of the plates 70 is secured by conventional fasteners 71 to the side rails 12 and 13 of the support 11.

The motor 65 includes a conventional right angle gear drive 72 having an output shaft 73. The shafts 62 and 73 are in parallel relationship to each other and carry respective sprockets 74 and 75 about which is entrained a drive chain 76. Movement is imparted to the conveyor 50 by the drive mechanism 65 in an obvious manner for a purpose to be described more fully hereafter.

During such movement of the conveyor 50, the upper pair of conveyor runs 53, 53 and the lower pair of conveyor runs 54, 54 are each guided by an identical elongated guide member 77 in a manner clearly illustrated in FIGURE 4 of the drawings to which attention is now directed. The guide member 77 of FIGURE 4 is the guide member associated with the upper run 53 of the chain conveyor 52, and a complete description thereof is considered sufficient for an understanding of the operation of each of the other guide members.

The guide member 77 of FIGURE 4 is of a substantially inverted L-shaped configuration and includes a base portion 78 and an upstanding leg 80 terminating in an elongated surface 81. The base portion 78 of the guide member 77 is welded to the side rail 12 of the support 11 adjacent an uppermost edge portion thereof. The leg 80 of the guide member 77 is received and confined between parallel opposed link elements 82, 82 of each of a plurality of connecting links (unnumbered) forming the chain 52, while the surface 81 of the leg 80 contacts each of a plurality of identical connectors or stubs 83 joining the link elements 82, 82. Thus, as the upper run 53 of the conveyor chain 52 is moved from left-to-right as viewed in FIGURE 4 of the drawings, the leg 80 of the guide member 77 cooperating with the link elements 82, 82 and the conventional connectors 83 maintain substantially linear straight-line motion of the upper run 53. The upper run 53 of the conveyor chain 51 and the lower runs 54, 54 of the conveyor chains 51 and 52 are similarly guided by the associated guide members 77 in a manner identical to that just described to guide these latter mentioned runs during the movement thereof.

A plurality of identical thermal-conductive sheet-like members or flags 85 are supported between the conveyor chains 51 and 52 of the conveyor 50. Each of the flags 85 is substantially rectangular in outline and is preferably constructed from relatively thin flexible woven fiberglass clother material impregnated with a polymerized tetrafluoro ethylene composition (not shown).

Each of the flags 85 includes a leading side or edge portion 86 (FIGURE 4) which is folded over and secured to itself to form a transverse gap 87 in which is received a transverse supporting member or rod 88. The transverse rods 88 are spaced an identical distance from each other and are secured between the conveyor chains 51 and 52 by an inverted T-shaped link 90 in a manner clearly illustrated in FIGURE 4 of the drawings. Each of the flags 85 is of a width substantially equal to the width of the rectangular plates 31 and 32 (FIGURES S7 and 8) and is of a length slightly greater than the distance between adjacent ones of the plurality of transverse rods 88 (FIGURE 6). As is best illustrated in FIGURE 6 of the drawings, the flags 85 between the upper pair of conveyor runs 53, 53 are in horizontal coplanar relationship and are conveyed from left-to-right across and beyond the surfaces 42 and 45 of the respective heating and cooling plates 35 and 44. The flags 85 between the lower pair of conveyor runs 54, 54 are also maintained in horizontal coplanar relationship by the bight portion 16 of the shallow inverted U-shaped lower plate 15, as is shown in FIGURES 6 through 8 of the drawings.

A depending flange 91 of an inverted substantially J-shaped guard rail 92 is welded to an uppermost edge portion of the side rail 12.

A pair of identical guard rails 93 and 94 are similarly welded to the side rail 13 of the support 11.

A flat vertical plate 95 is welded to the side rail 13 of the support 11 between the guard rails 93 and 94, as is best illustrated in FIGURES 3, 6 and 7 of the drawings. A generally horizontally disposed pivotable arm 96 is secured to the vertical plate 95 by a conventional pivotable connection 97. A tire 98 carried by a wheel 100 is conventionally rotatably mounted on a shaft 101 of the arm 96 remote from the pivotable connection 97. A short cylindrical stub 102 is welded to the arm 96 in overlying relationship to a rod 103 secured to the vertical plate 95. A wing bolt 104 is received in a threaded vertical bore (not shown) in the cylindrical stub 102 and contacts an upper surface (unnumbered) of the rod 103. The wing bolt 104 is adjusted in a conventional manner and locked in any adjusted position by a nut 105 to preposition the tire 98 a predetermined distance above the planar surface 42 of the heating plate 35 in a manner clearly illustrated in FIGURES 6 and 7 of the drawings.

A package P (FIGURES 1 and 2) which is to be sealed by the heat sealing apparatus 10 comprises one or more articles (not shown) positioned in a shallow tray T which has a generally flat bottom panel B and opposed pairs of upwardly diverging end panels and side panels (unnumbered). The tray T with the article or articles therein is packaged in a thermoplastic film or wrapper W which is of a bag-like nature and is opened only at an edge portion E thereof. After the tray T is received in the wrapper W, the edge portion E is folded along a pair of fold lines (unnumbered) to form two flaps F, F after which the now folded edge portion E is underfolded as at U adjacent the bottom panel B of the tray T.

As the upper pair of conveyor runs 53, 53 are moved from left-to-right as viewed in FIGURES 3 and 6 of the drawings by the drive mechanism 65 in the manner heretofore described, an individual package P is manually or automatically positioned on each of the flags 85 at the entrance end of the heat sealing apparatus 10 adjacent the shaft 61. Each package is positioned on each flag 85 with the longitudinal center line of the package normal to the direction of travel of the conveyor 50. The underfolded portion U is adjacent the upper run 53 of the conveyor chain 51. As the packages are carried by the flags 85 across the planar surface 42 of the heat plate 35, the heat is transferred from the heating plate 35 through the thermal-conductive flags 85 and then into the thermoplastic material of the wrapper W so as to soften this wrapper sufficiently so that the plastic welds or fuses together. If the packages carried by the flags 85 are of a relatively lightweight construction the freely rotatable tire 98 applies pressure to the packages from above in order to effect the fusion of the plastic material underlying the bottom of the tray and the underfolded portion of the wrapper. Upon the completion of the heat sealing operation at the area of the heating plate 35, each of the packages carried by the flags 85 are transported across and beyond the surface 45 of the cooling plate 44. The cooling plate 44 cools each of the packages in an obvious manner, so as to set up the plastic into its original condition eliminating the tackiness of the heated plastic and restoring its original strength making the packages easier to remove from the flags, after which the heat sealed packages are discharged from the conveyor 50 of the heat sealing apparatus 10 in a conventional manner ready for further necessary handling. The package at the completion of the heat sealing operation performed by the heat sealing apparatus 10 is shown in the right-hand-most portion of FIGURES 1 and 2.

It should be particularly noted that the packages at no time during the heat sealing operation directly or indirectly contact either the heating plate 35 or the cooling plate 44. Furthermore, while the flags 85 are subjected to a temperature gradient during the passage thereof across the heating plate 35 and the cooling plate 44, the conveyor chains 51 and 52 of the conveyor mechanism 50 are at no time subjected to this temperature gradient. Thus, while the flags 85 are subjected to slight expansion and contraction, the conveyor chains 51 and 52 are substantially unaffected by this temperature gradient.

Since the polymerized tetrafluoro ethylene coating of the flags 85 is essentially very slippery and stick-resistant the thermoplastic material of the wrappers does not stick to the flags 85 during the passage thereof across the heating plate 35 and, of course, cannot stick to the heating plate 35 for contact between the packages and the heating plate 35 is precluded by the flags 85 upon which the packages are carried.

The flags 85 are also readily replaceable as each becomes damaged or worn. To facilitate this replacement, the transverse rods 88 can be provided with internally threaded axially bored end portions (unnumbered) which are connected to the T-shaped links 90 carried by the conveyor chains 51 and 52 by means of machine screws 89 passing through apertures (also unnumbered) in the T-shaped links and received in the threaded bores in the ends of the rods 88. In this manner, any one of the plurality of flags 85 which is damaged could be readily and rapidly replaced within a relatively short period of time.

While a preferred embodiment of the invention has been disclosed herein, it is to be understood that variations in the components of the heat sealing apparatus 10 may be made within the scope of this invention. For example, an additional heating and cooling plate, similar to the heating and cooling plates 35 and 44 respectively, can be located adjacent the plates 35 and 44 on the opposite side of the longitudinal center line of the apparatus 10 to heat seal packages which include wrappers of a tubular nature opened at two end portions. In this case, such tubular wrappers would be folded at each end in the manner heretofore described in the consideration of the package P and then positioned on the flags 85 so that an underfolded portion would overlie the plates 35 and 44 while an opposite underfolded portion would underlie the added heating and cooling plates opposite the longitudinal center line of the apparatus 10. In this manner, both edge portions of a tubular wrapper could be concurrently heat sealed by a slight modification of the heat sealing apparatus 10.

A tire, such as the tire 98, can also be added to overlie the additional heating plate to urge a relatively light package downwardly into intimate engagement with the flag upon which such package is carried.

It will also be apparent that the heat sealing apparatus 10 is capable of sealing a plastic package formed by covering an article with a sheet or wrapper of thermoplastic film and drawing the edges of the film underneath the article in overlapping relationship and then placing the article onto one of the flags 85 with the gathered edges resting on such flag. For such sealing, the heating plate 35 would be more centrally located and would be of a greater width to insure that all of the gathered edges would be fused and sealed. The cooling plate 44, of course, would be in longitudinal alignment with the heating plate 35 and would be at least as wide as the heating plate, and preferably, wider to insure proper cooling of all of the heated gathered edges of the thermoplastic wrapper.

It is also to be understood that the heating plate 35 and cooling plate 44 are automatically maintained at desired temperatures by means of standard commercial temperature control regulators which have not been illustrated for the sake of simplicity.

From the foregoing, it will be apparent that the heat sealing apparatus disclosed herein will operate to effectively heat seal packages of the character described for carrying out the desired end. However, attention is again directed to the fact that other variations may be made in the example method and apparatus disclosed herein without departing from the spirit and scope of this invention, as defined in the appended claims.

I claim:

1. Apparatus for heat sealing thermoplastic packages comprising a conveyor having upper and lower spaced pairs of conveyor runs, heating means supported between the upper pair of conveyor runs, a plurality of substantially horizontally disposed individual means between the pairs of conveyor runs for carrying thermoplastic packages over and across said heating means, said individual means each being a sheet-like member, means movably connecting each of the sheet-like members at only one side thereof between the conveyor runs and said heating means including a supporting surface in a plane substantially parallel to a plane through the upper pair of conveyor runs whereby each of the sheet-like members is supported by said supporting surface and thermoplastic packages carried thereover by the sheet-like members are sealed by said heating means, wherein means are provided for maintaining the sheet-like members between the lower conveyor runs in a second plane substantially parallel to the plane through the upper pair of conveyor runs.

2. Apparatus for sealing thermoplastic packages comprising a conveyor mechanism including first and second conveyor chains spaced to define upper and lower pairs of chain conveyor runs, heating means supported between said upper pairs of conveyor runs to one side of a longitudinal center line between the upper pair of conveyor runs, cooling means supported between said upper pair of conveyor runs to one side of a longitudinal center line between the upper pair of conveyor runs, said heating and cooling means including respective heating and cooling surfaces substantially coplanar to a plane through said upper pair of conveyor runs, a plurality of sheet-like members carried by said chains, connecting means swingably joining each of the sheet-like members solely at an edge thereof to each of a plurality of transverse support members secured between said chains, a member below said lower pair of conveyor runs for supporting the sheet-like members therebetween in a plane substantially parallel to said first mentioned plane, means above said heating means for urging thermoplastic packages carried by the sheet-like members into intimate contact therewith, and each of said sheet-like members being constructed from fiberglass coated with a polymerized tetrafluoro ethylene composition.

3. The apparatus as defined in claim 1 wherein each of the sheet-like members is constructed from fiberglass.

4. The apparatus as defined in claim 1 wherein means are provided for urging thermoplastic packages carried by the sheet-like members into intimate contact therewith.

5. The apparatus as defined in claim 1 wherein said connecting means each comprise a support member carried by and between the upper and lower spaced pairs of conveyor runs, and each sheet-like member is swingably connected solely at said one side thereof to each support member.

6. The apparatus of claim 4 wherein said latter means provide an urging force transversely of said supporting surface and comprise a rotary member positioned above the path of travel of the packages.

7. The apparatus of claim 6 wherein said rotary member is adjustable in height depending upon the height of a package passed therebeneath.

8. The apparatus of claim 6 wherein said rotary member comprises a tire.

9. The apparatus of claim 5 wherein each support member comprises a bar-like element receivably engaged within a looped portion of an associated sheet member.

10. The apparatus of claim 5 wherein each support member is removably connected at at least one end thereof to an associated conveyor run.

11. The apparatus of claim 1 wherein guide bars are provided for the upper pair of conveyor runs, spaced inwardly thereof.

12. The apparatus of claim 11 wherein guard rail means are provided in spaced overlying relation to said upper conveyor runs for preventing contact of packages with said conveyor runs.

References Cited
UNITED STATES PATENTS

| | | |
|---|---|---|
| 2,727,345 | 12/1955 | Schoppee. |
| 2,899,791 | 8/1959 | Anderson _____ 53—388 X |
| 2,904,943 | 9/1959 | Dreyfus et al. _____ 53—388 X |
| 3,083,514 | 4/1963 | Smith et al. _____ 53—279 X |
| 3,187,484 | 6/1965 | Smith _____ 53—379 |

TRAVIS S. McGEHEE, *Primary Examiner.*